(No Model.)
N. TESLA.
ELECTRO MAGNETIC MOTOR.
No. 418,248. Patented Dec. 31, 1889.
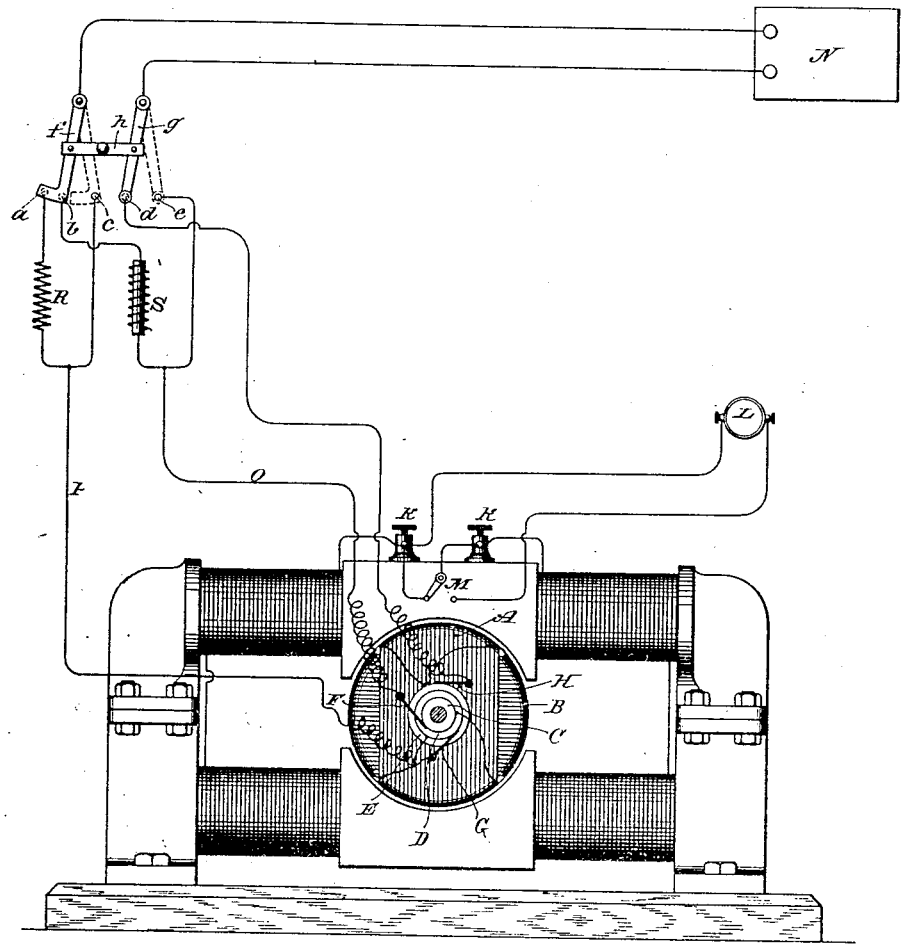
Witnesses:
Raphael Netter
Robt. F. Gaylord
Inventor
Nikola Tesla
By
Duncan, Curtis & Page
Attorneys.

UNITED STATES PATENT OFFICE.

NIKOLA TESLA, OF NEW YORK, N. Y., ASSIGNOR TO THE TESLA ELECTRIC COMPANY, OF SAME PLACE.

ELECTRO-MAGNETIC MOTOR.

SPECIFICATION forming part of Letters Patent No. 418,248, dated December 31, 1889.

Application filed May 20, 1889. Serial No. 311,420. (No model.)

*To all whom it may concern:*

Be it known that I, NIKOLA TESLA, a subject of the Emperor of Austria-Hungary, formerly of Smiljan, Lika, border country of Austria-Hungary, but now residing at New York, in the county and State of New York, have invented certain new and useful Improvements in Methods of Operating Electro-Magnetic Motors, of which the following is a specification, reference being had to the drawing accompanying and forming a part of the same.

In a patent granted to me April 16, 1889, No. 401,520, I have shown and described a method of operating alternating-current motors by first shifting or rotating their magnetic poles until they had reached or passed a synchronous speed and then alternating the poles, or, in other words, by transforming the motor by a change of circuit-connections from one operated by the action of two or more independent energizing-currents to a motor operated by a single current or several acting as one.

The present invention is a specific way of carrying out the same invention; and it consists in the following method: On the start I progressively shift the magnetic poles of one element or field of the motor by alternating currents differing in phase as passed through independent energizing-circuits and short-circuit the coils of the other element. When the motor thus started reaches or passes the limit of speed synchronous with the generator, I connect up the coils previously short-circuited with a source of direct current and by a change of the circuit-connections produce a simple alternation of the poles. The motor then continues to run in synchronism with the generator. There are many specifically-different ways in which this may be carried out; but I have selected one for illustrating the principle. This is illustrated in the annexed drawing, which is a side view of a motor with a diagram of the circuits and devices used in the system.

The motor shown is one of the ordinary forms, with field-cores either laminated or solid and with a cylindrical laminated armature wound, for example, with the coils A B at right angles. The shaft of the armature carries three collecting or contact rings C D E. (Shown, for better illustration, as of different diameters.)

One end of coil A connects to one ring, as C, and one end of coil B connects with ring D. The remaining ends are connected to ring E. Collecting springs or brushes F G H bear upon the rings and lead to the contacts of a switch, to be hereinafter described. The field-coils have their terminals in binding-posts K K, and may be either closed upon themselves or connected with a source of direct current L by means of a switch M. The main or controlling switch has five contacts $a\,b\,c\,d\,e$ and two levers $f\,g$, pivoted and connected by an insulating cross-bar $h$, so as to move in parallelism. These levers are connected to the line-wires from a source of alternating currents N. Contact $a$ is connected to brush G and coil B through a dead-resistance R and wire P. Contact $b$ is connected with brush F and coil A through a self-induction-coil S and wire O. Contacts $c$ and $e$ are connected to brushes G F, respectively, through the wires P O, and contact $d$ is directly connected with brush H. The lever $f$ has a widened end, which may span the contacts $a\,b$. When in such position and with lever $g$ on contact $d$, the alternating currents divide between the two motor-coils, and by reason of their different self-induction a difference of current-phase is obtained that starts the motor in rotation. In starting, as I have above stated, the field-coils are short-circuited.

When the motor has attained the desired speed, the switch is shifted to the position shown in dotted lines—that is to say, with the levers $f\,g$ resting on points $c\,e$. This connects up the two armature-coils in series, and the motor will then run as a synchronous motor. The field-coils are thrown into circuit with the direct-current source when the main switch is shifted.

What I claim herein as my invention is—

1. The method of operating electro-magnetic motors, which consists in first progressively shifting or rotating the magnetic poles of one element until it has reached a synchronous speed and then alternating said poles and passing a direct current through the coils of the other element, as herein set forth.

2. The method of operating electro-magnetic motors, which consists in short-circuiting the coils of one element, as the field-magnet, and passing through the energizing-coils of the other element, as the armature, alternating currents differing in phase, and then, when the motor has attained a given speed, passing through the field-coils a direct current and through the armature-coils alternating currents coinciding in phase.

NIKOLA TESLA.

Witnesses:
R. J. STONEY, Jr.,
E. P. COFFIN.